US012522293B2

(12) United States Patent
Yoshikawa et al.

(10) Patent No.: US 12,522,293 B2
(45) Date of Patent: Jan. 13, 2026

(54) CRAWLER-TYPE WORK MACHINE

(71) Applicant: KOMATSU LTD., Tokyo (JP)

(72) Inventors: Takeshi Yoshikawa, Tokyo (JP);
Hiroaki Takeshima, Tokyo (JP); Naoya Akiyama, Tokyo (JP); Kazushi Nakata, Tokyo (JP); Osamu Yatsuda, Tokyo (JP); Shinichi Otaka, Tokyo (JP); Yuji Nameki, Tokyo (JP); Ryoichi Nagasaka, Tokyo (JP); Takaomi Komura, Tokyo (JP)

(73) Assignee: KOMATSU LTD., Tokyo (JP)

( * ) Notice: Subject to any disclaimer, the term of this patent is extended or adjusted under 35 U.S.C. 154(b) by 442 days.

(21) Appl. No.: 18/253,842

(22) PCT Filed: Dec. 15, 2021

(86) PCT No.: PCT/JP2021/046213
§ 371 (c)(1),
(2) Date: May 22, 2023

(87) PCT Pub. No.: WO2022/158179
PCT Pub. Date: Jul. 28, 2022

(65) Prior Publication Data
US 2024/0101192 A1 Mar. 28, 2024

(30) Foreign Application Priority Data

Jan. 21, 2021 (JP) .................................. 2021-008066

(51) Int. Cl.
*B62D 11/18* (2006.01)
*E02F 9/22* (2006.01)

(52) U.S. Cl.
CPC ............ *B62D 11/183* (2013.01); *E02F 9/225* (2013.01)

(58) Field of Classification Search
CPC ....... B62D 11/08; B62D 11/001; B62D 11/12; B62D 11/18; E02F 9/225; E02F 9/2267; B60W 10/20
See application file for complete search history.

(56) References Cited

U.S. PATENT DOCUMENTS

2002/0020579 A1  2/2002 Yamamoto et al.
2002/0193927 A1  12/2002 Nakagawa et al.
(Continued)

FOREIGN PATENT DOCUMENTS

CN  2585894 Y  11/2003
CN  202574365 U  12/2012
(Continued)

OTHER PUBLICATIONS

Espace translation of JP 2010144598 A (Year: 2010).*
(Continued)

*Primary Examiner* — Jason D Shanske
*Assistant Examiner* — Scott Lawrence Strickler
(74) *Attorney, Agent, or Firm* — GLOBAL IP COUNSELORS, LLP

(57) ABSTRACT

In a crawler type work machine, when switching from a pivot turning mode to a straight travel mode or a slow turning mode, a controller is configured to maintain a rotation speed of the turning motor until after a first timing at which the inside steering clutch begins partial engagement.

4 Claims, 6 Drawing Sheets

(56) References Cited

U.S. PATENT DOCUMENTS

| | | | |
|---|---|---|---|
| 2005/0183416 A1* | 8/2005 | Hayashi | ............... E02F 9/2296 60/445 |
| 2012/0285765 A1 | 11/2012 | Zulu | |
| 2014/0196961 A1 | 7/2014 | Yoshikawa et al. | |

FOREIGN PATENT DOCUMENTS

| CN | 103534467 | A | | 1/2014 | |
|---|---|---|---|---|---|
| CN | 203639965 | U | | 6/2014 | |
| JP | 53-27929 | A | | 3/1978 | |
| JP | H0710031 | A | | 1/1995 | |
| JP | H07205671 | A | | 8/1995 | |
| JP | 2001-260928 | A | | 9/2001 | |
| JP | 2002-293261 | A | | 10/2002 | |
| JP | 2004-34724 | A | | 2/2004 | |
| JP | 2010144598 | A | * | 7/2010 | |
| KR | 20170143301 | A | * | 12/2017 | ............. A01D 69/08 |

OTHER PUBLICATIONS

Espace translation of KR 20170143301 A (Year: 2017).*
First Office Action received for Chinese Application Serial No. 202180072928.9, mailed on Apr. 10, 2025, 10 pages. (Including English Translation).
The International Search Report for the corresponding international application No. PCT/JP2021/046213, issued on Feb. 15, 2022.

* cited by examiner

CRAWLER-TYPE WORK MACHINE

CROSS-REFERENCE TO RELATED APPLICATIONS

This application is a U.S. National stage application of International Application No. PCT/JP2021/046213, filed on Dec. 15, 2021. This U.S. National stage application claims priority under 35 U.S.C. § 119(a) to Japanese Patent Application No. 2021-008066, filed in Japan on Jan. 21, 2021, the entire contents of which are hereby incorporated herein by reference.

BACKGROUND

Technical Field

The present disclosure relates to a crawler-type work machine.

Background Information

Conventionally, there is known a crawler-type work machine (for example, a bulldozer or the like) that comprises left and right planetary gear mechanisms, left and right hydraulic drive steering clutches, left and right hydraulic drive steering brakes, and a turning motor (see Japanese Patent Laid-open No. S53-27929).

The left and right planetary gear mechanisms are disposed between an input shaft and left and right output shafts. The left and right steering clutches are able to rotate about the input shaft and switch between transmitting and blocking rotational power from the input shaft to the left and right output shafts by means of the left and right planetary gear mechanisms. The left and right steering brakes brake the left and right output shafts. The turning motor causes the left and right steering clutches to rotate so that a rotation speed difference is produced between the left and right output shafts.

The crawler-type work machine described in Japanese Patent Laid-open No. S53-27929 travels straight by causing the left and right steering clutches to engage, causing the left and right steering brakes to disengage, and stops the turning motor.

The crawler-type work machine described in Japanese Patent Laid-open No. S53-27929 turns in a slow turning mode by causing the left and right steering clutches to engage, causing the left and right steering brakes to disengage, and driving the turning motor.

The crawler-type work machine described in Japanese Patent Laid-open No. S53-27929 turns in a pivot turning mode by causing the inside steering clutch to disengage, causing the inside steering brake to brake, and stopping the turning motor.

SUMMARY

That being said, the turning speed can increase during the pivot turning due to the turning motor being driven even in the pivot turning mode.

In this case, because the inside steering clutch is disengaged in the pivot turning mode, the inside planetary gear mechanism rotates freely due to the rotational power from the input shaft and the inside steering clutch also rotates freely due to the driving power of the turning motor.

However, when quickly switching from, for example, the pivot turning mode to the straight travel mode, when the turning motor is stopped and the inside steering clutch is engaged, the inside steering clutch is also stopped accompanying the stopping of the turning motor, so the relative rotation of the inside steering clutch with respect to the inside planetary gear mechanism increases. When the inside steering clutch is engaged in this state, there is a concern that an excessive heating load will be generated on the inside steering clutch.

An object of the present disclosure is to provide a crawler-type work machine in which the heating load on the inside steering clutch can be restrained.

A crawler-type work machine according to an aspect of the present disclosure comprises left and right planetary gear mechanisms, left and right steering clutches, left and right steering brakes, a turning motor, and a controller. The left and right planetary gear mechanisms are disposed between an input shaft and left and right output shafts. The left and right steering clutches are configured to rotate about the input shaft and switch between transmitting and blocking rotational power from the input shaft to the left and right output shafts by means of the left and right planetary gear mechanisms. The left and right steering brakes are configured to brake the left and right output shafts. The turning motor is configured to cause the left and right steering clutches to rotate so that a rotation speed difference is produced between the left and right output shafts. The controller is configured to control the left and right steering clutches, the left and right steering brakes, and the turning motor thereby causing the crawler-type work machine to travel in a straight travel mode, a slow turning mode, or a pivot turning mode. In the straight travel mode, the controller is configured to cause the left and right steering clutches to engage, cause the left and right steering brakes to disengage, and stop the turning motor. In the slow turning mode, the controller is configured to cause the left and right steering clutches to engage, cause the left and right steering brakes to disengage, and drive the turning motor. In the pivot turning mode, the controller is configured to cause an inside steering clutch corresponding to a turning direction among the left and right steering clutches to disengage, cause an inside steering brake corresponding to the turning direction among the left and right steering brakes to brake, and drive the turning motor. When switching from the pivot turning mode to the straight travel mode or the slow turning mode, the controller is configured to maintain a rotation speed of the turning motor until after a first timing when the inside steering clutch begins partial engagement.

According to the present disclosure, there can be provided a crawler-type work machine in which the heating load on the inside steering clutch can be restrained.

DETAILED DESCRIPTION OF EMBODIMENT(S)

(Configuration of Bulldozer 1)

Figure 1:
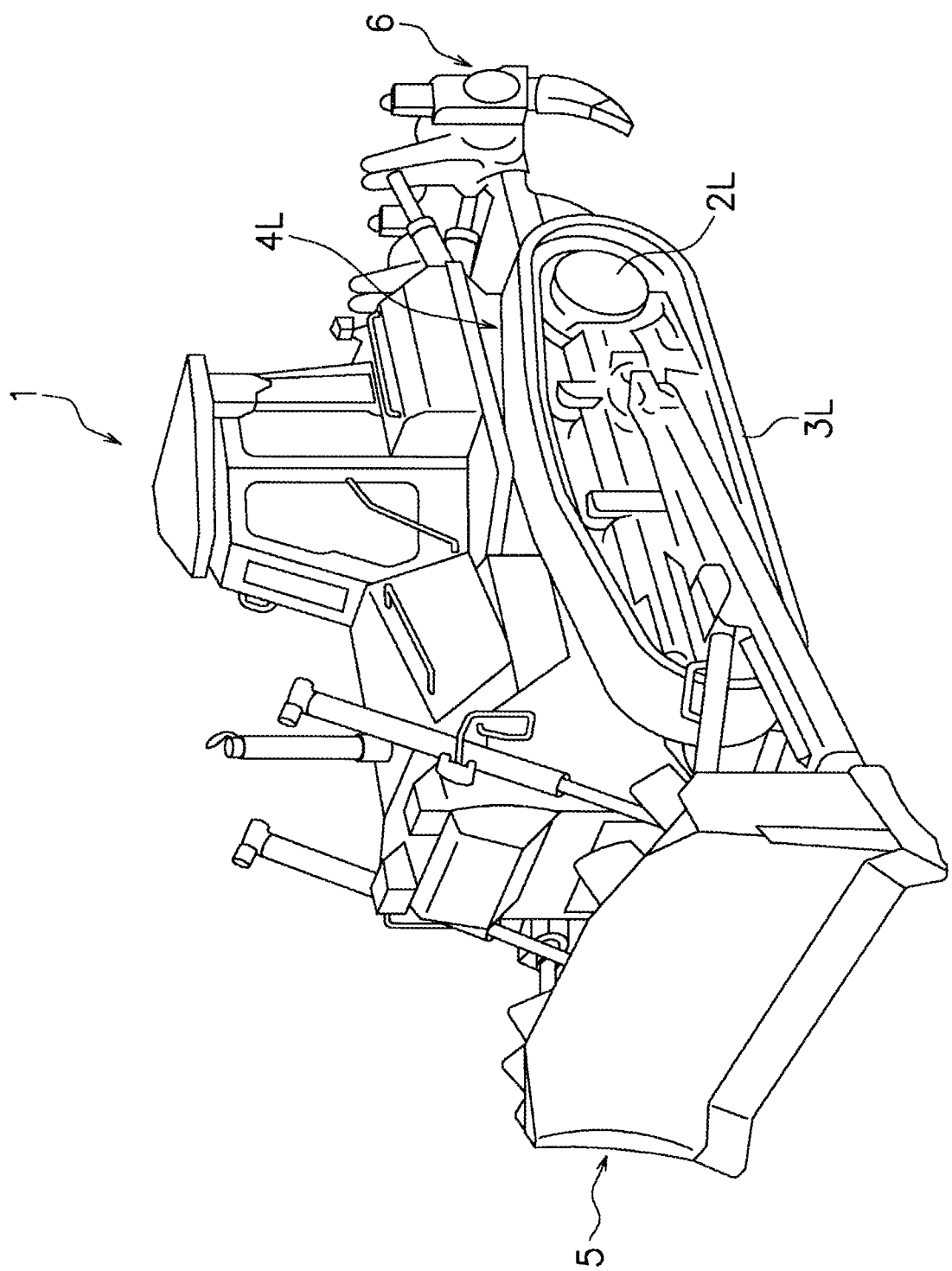
FIG. 1 is a perspective view of a bulldozer according to an embodiment.
Figure 2:
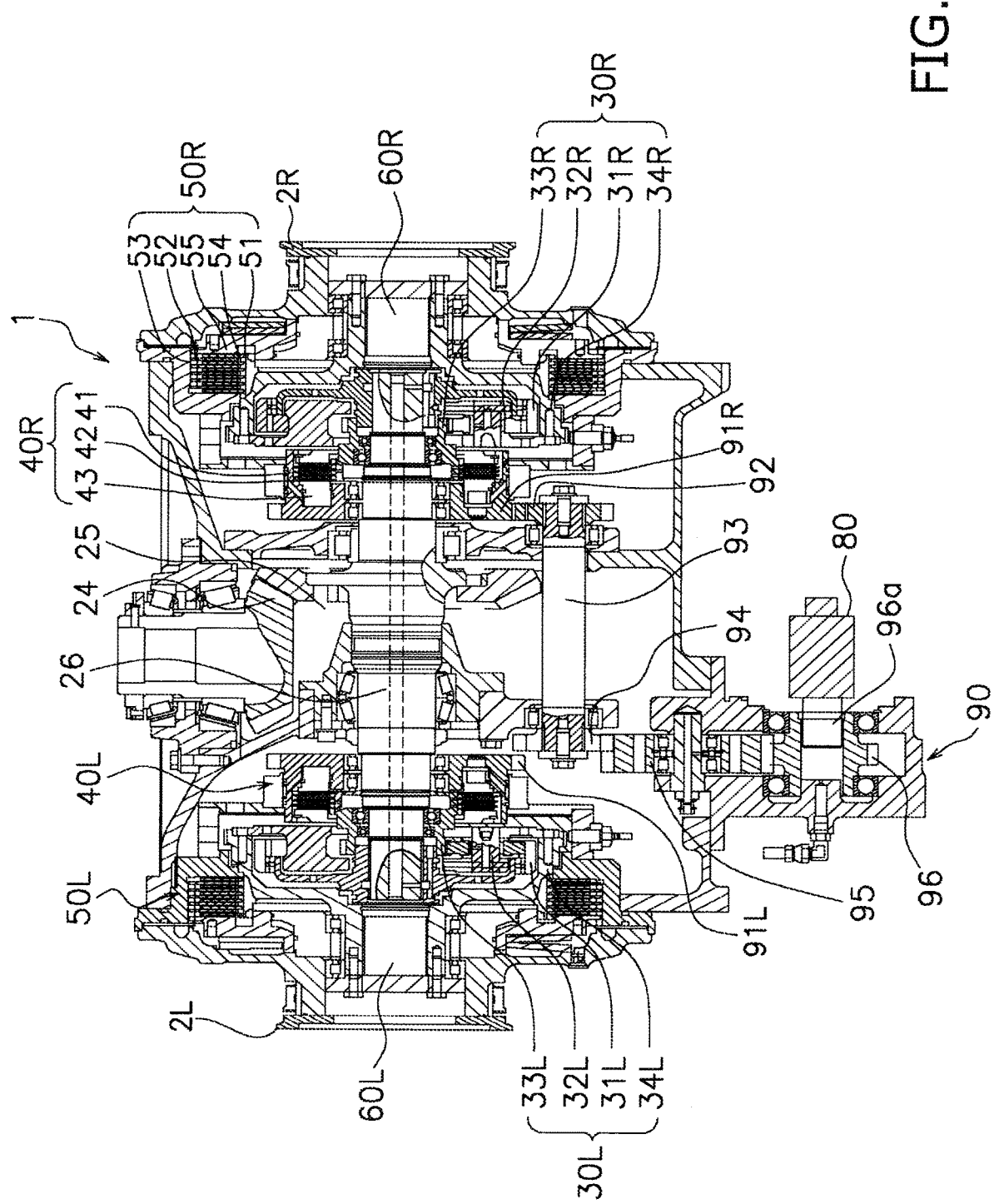
FIG. 2 is a cross-sectional configuration view of a power transmission system of the bulldozer according to the embodiment.
Figure 3:
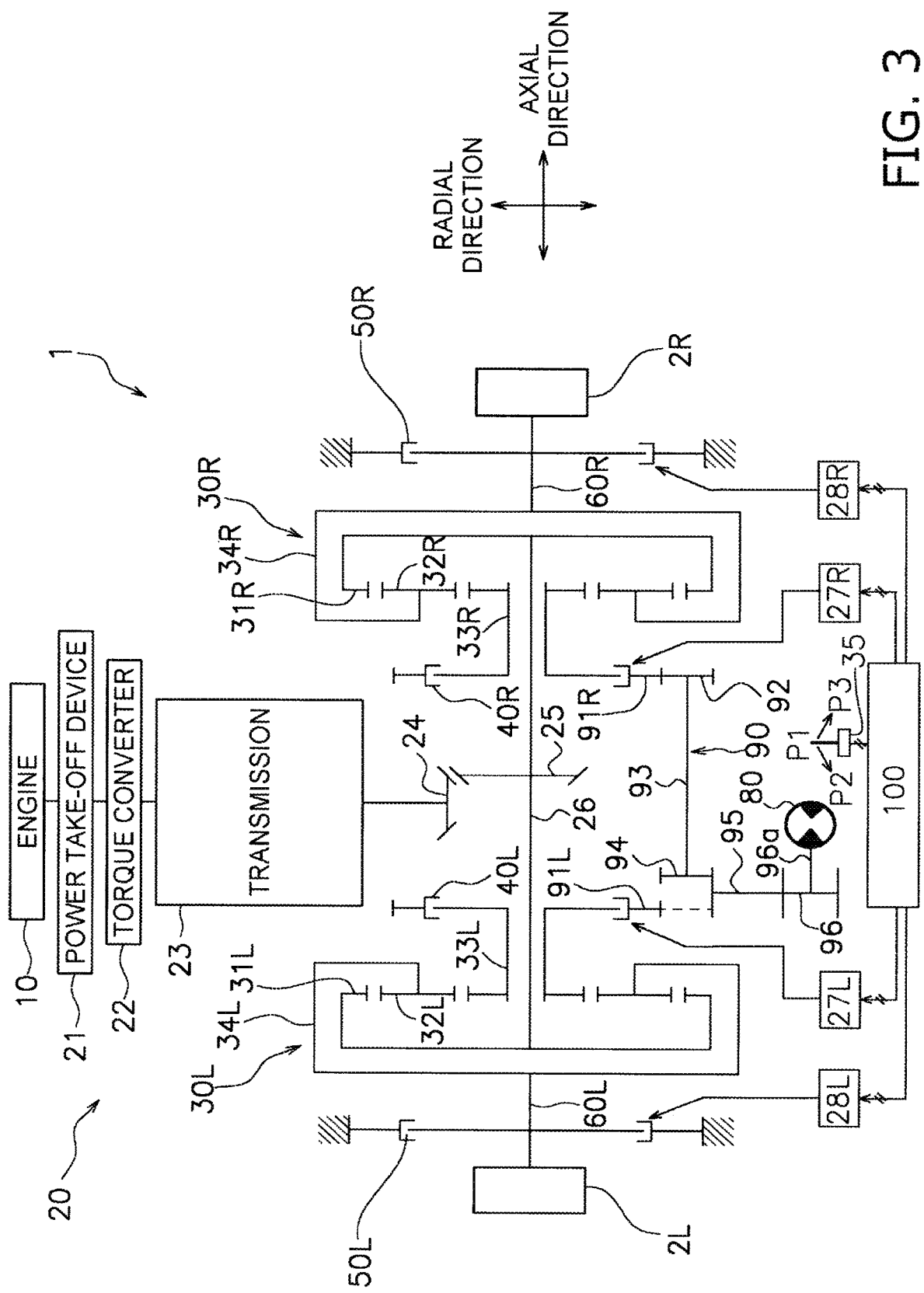
FIG. 3 is an outline system configuration view of the power transmission system of the bulldozer according to the embodiment.

FIG. 1 is a perspective view of a bulldozer 1 that is an example of the crawler-type work machine. FIG. 2 is a cross-sectional configuration view of the power transmission system of the bulldozer 1. FIG. 3 is an outline system configuration view of the power transmission system of the bulldozer 1.

As illustrated in FIG. 1, the bulldozer 1 is provided with left and right travel devices 4L, 4R that respectively have left and right sprockets 2L, 2R and left and right crawler belts 3L, 3R; a blade 5 provided to a vehicle front section; and a ripper device 6 provided to a vehicle rear section.

The bulldozer 1 is able to do work such as pushing earth with the blade 5 and work such as crushing and excavating with the ripper device 6.

As illustrated in FIGS. 2 and 3, the bulldozer 1 includes an engine 10, an engine power transmitting unit 20, left and right planetary gear mechanisms 30L, 30R, left and right steering clutches 40L, 40R, left and right steering brakes 50L, 50R, left and right output shafts 60L, 60R, a turning motor 80, a motor power transmitting unit 90, and a controller 100.

(Engine Power Transmitting Unit)

The engine power transmitting unit 20 transmits power from the engine 10 to the left and right planetary gear mechanisms 30L, 30R. The engine power transmitting unit 20 includes a power take-off device 21, a torque converter 22, a transmission 23, a pinion 24, a bevel gear 25, and an input shaft 26.

The power transmission device 21 transmits power from the engine 10 to the torque converter 22. The torque converter 22 transmits the power of the engine 10 transmitted by the power take-off device 21 to the transmission 23 by means of a fluid. The transmission 23 has a plurality of velocity stage clutches for changing the rotational power transmitted from the torque converter 22, and a direction stage clutch for switching between forward travel and reverse travel. The transmission 23 is coupled to the pinion 24. The power from the transmission 23 is transmitted through the pinion 24 and the bevel gear 25 to the input shaft 26. The input shaft 26 extends in the left-right direction. The axial direction of the input shaft 26 has the same meaning as the left-right direction of the bulldozer 1.

(Planetary Gear Mechanisms)

The left and right planetary gear mechanisms 30L, 30R are disposed between the input shaft 26 and the left and right output shafts 60L, 60R. The left and right planetary gear mechanisms 30L, 30R respectively have left and right ring gears 31L, 31R, left and right planetary gears 32L, 32R, left and right sun gears 33L, 33R, and left and right carriers 34L, 34R.

The left and right ring gears 31L, 31R are coupled to the input shaft 26. The left and right planetary gears 32L, 32R are respectively disposed on the inside of the left and right ring gears 31L, 31R in a radial direction perpendicular to the axial direction of the input shaft 26. The left and right planetary gears 32L, 32R respectively mesh with the left and right ring gears 31L, 31R and the left and right sun gears 33L, 33R. The left and right sun gears 33L, 33R are rotatably attached to the input shaft 26. The left and right sun gears 33L, 33R are respectively disposed on the inside of the left and right planetary gears 32L, 32R in the radial direction. The left and right sun gears 33L, 33R are respectively coupled to the left and right steering clutches 40L, 40R. The left and right sun gears 33L, 33R are able to separate from the motor power transmitting unit 90 (specifically, below-mentioned left and right clutch gears 91L, 91R) by means of the left and right steering clutches 40L, 40R. The left and right carriers 34L, 34R are respectively coupled to the left and right planetary gears 32L, 32R and the left and right output shafts 60L, 60R.

(Steering Clutches)

The left and right steering clutches 40L, 40R are respectively disposed between the left and right planetary gear mechanisms 30L, 30R and the motor power transmitting unit 90. The left and right steering clutches 40L, 40R respectively disengage from the left and right sun gears 33L, 33R of the left and right planetary gear mechanisms 30L, 30R and from the left and right clutch gears 91L, 91R of the motor power transmitting unit 90.

The left and right steering clutches 40L, 40R are driven by the supply of hydraulic fluid. The left and right steering clutches 40L, 40R are configured by wet multiplate clutches that can be engaged and disengaged. In the present embodiment, the left and right steering clutches 40L, 40R are positive-type hydraulic clutches. The left and right steering clutches 40L, 40R are disengaged when hydraulic fluid is not supplied, are partially engaged when the pressure of the supplied hydraulic fluid is less than a predetermined value, and are completely engaged when the pressure of the supplied hydraulic fluid is equal to or greater than the predetermined value.

The pressure of the hydraulic fluid supplied to the left and right steering clutches 40L, 40R is controlled by clutch control valves 27L, 27R. The left and right clutch control valves 27L, 27R are driven in response to a clutch hydraulic pressure command inputted from the controller 100.

The left and right steering clutches 40L, 40R switch between transmitting and blocking the rotational power from the input shaft 26 to the respective left and right output shafts 60L, 60R by means of the respective left and right planetary gear mechanisms 30L, 30R.

Specifically, the rotation of the input shaft 26 is transmitted through the left ring gear 31L, the left planetary gear 32L, and the left carrier 34L to the left output shaft 60L when the left steering clutch 40L is engaged. Conversely, when the left steering clutch 40L is disengaged, the left sun gear 33L enters a freely rotating state and the transmission of the rotational power from the input shaft 26 to the left output shaft 60L is blocked. Similarly, the transmission or blocking of the rotational power from the input shaft 26 to the right output shaft 60R is switched in response to the engagement or disengagement of the right steering clutch 40R.

The left and right steering clutches 40L, 40R are able to rotate about the input shaft 26. The left and right steering clutches 40L, 40R rotate in mutually opposite directions due to the rotational power from the turning motor 80 being transmitted through the motor power transmitting unit 90.

For example, when the right steering clutch 40R rotates in reverse while the left steering clutch 40L rotates in the forward direction while the left and right steering clutches 40L, 40R are engaged, the rotation speed of the left output shaft 60L increases more than the rotation speed of the right output shaft 60R and the bulldozer 1 turns slowly to the right.

In the present description, slow turning signifies that forward travel or reverse travel occurs such that an arc is drawn with a relatively large turning radius due to the rotation speed difference being produced between the left and right output shafts 60L, 60R that rotate in the same direction.

In addition, when the left steering clutch 40L rotates in the forward direction while the left steering clutch 40L is engaged and the right steering clutch 40R is disengaged, the rotation of the right output shaft 60R is stopped and the left output shaft 60L rotates whereby the bulldozer 1 makes a pivot turn to the right. However, when the bulldozer 1 makes a pivot turn to the right, the right steering brake 50R brakes the right output shaft 60R as discussed below.

In the present description, pivot turning signifies turning using the crawler belt on the other side as an axis due to one of the left and right output shafts 60L, 60R being substantially or completely stopped while the other is rotating.

As illustrated in FIG. 2, the right steering clutch 40R has a plurality of clutch plates 41, a plurality of clutch disks 42, and a clutch piston 43.

The clutch plates 41 are attached to the right clutch gear 91R. The clutch disks 42 are fixed to the right sun gear 33R. The clutch plates 41 and the clutch disks 42 are disposed alternately in the axial direction.

When the clutch piston 43 moves in the right direction accompanying the supply of hydraulic fluid, the clutch plates 41 and the clutch disks 42 are pressed together and the right steering clutch 40R is engaged. Consequently, the right sun gear 33R of the right planetary gear mechanism 30R and the right clutch gear 91R of the motor power transmitting unit 90 are joined together.

When the clutch piston 43 moves in the left direction accompanying the discharge of hydraulic fluid, the clutch plates 41 and the clutch disks 42 separate and the right steering clutch 40R is disengaged. Consequently, the right sun gear 33R of the right planetary gear mechanism 30R and the right clutch gear 91R of the motor power transmitting unit 90 move away from each other.

The left steering clutch 40L has the same configuration as the right steering clutch 40R.

(Steering Brakes)

The left and right steering brakes 50L, 50R are driven by the supply of hydraulic fluid. The left and right steering brakes 50L, 50R are configured by wet multiplate clutches that can be engaged and disengaged. In the present embodiment, the left and right steering brakes 50L, 50R are negative-type hydraulic brakes. The left and right steering brakes 50L, 50R are completely engaged when hydraulic fluid is not supplied, are partially engaged when the pressure of the supplied hydraulic fluid is less than a predetermined value, and are disengaged when the pressure of the supplied hydraulic fluid is equal to or greater than the predetermined value. When the left and right steering brakes 50L, 50R are engaged (complete engagement or partial engagement), a braking force is produced on the left and right steering brakes 50L, 50R.

The pressure of the hydraulic fluid supplied to the left and right steering brakes 50L, 50R is controlled by left and right brake control valves 28L, 28R. The left and right brake control valves 28L, 28R are driven in response to a brake hydraulic pressure command inputted from the controller 100.

The left and right steering brakes 50L, 50R respectively brake the rotation of the left and right output shafts 60L, 60R.

Specifically, when the left steering brake 50L is engaged, braking is applied to the rotation of the left output shaft 60L and the rotation of the left sprocket 2L is reduced. Conversely, when the right steering brake 50R is engaged, braking is applied to the rotation of the right output shaft 60R and the rotation of the right sprocket 2R is reduced.

As illustrated in FIG. 2, the right steering brake 50R has a rotating member 51, a brake housing 52, a plurality of fixing plates 53, a plurality of brake disks 54, and a brake piston 55.

The rotating member 51 is fixed to the right output shaft 60R and rotates with the right output shaft 60R. The brake housing 52 is fixed to the rotating member 51. The fixing plates 53 are attached to the brake housing 52. The brake disks 54 are fixed to the rotating member 51. The fixing plates 53 and the brake disks 54 are disposed alternately in the axial direction.

When the brake piston 55 moves in the left direction accompanying the filling of hydraulic fluid, the fixing plates 53 and the brake disks 54 separate and the right steering brake 50R is disengaged. Conversely, when the brake piston 55 moves in the right direction accompanying the discharge of hydraulic fluid, the fixing plates 53 and the brake disks 54 are pressed together and the braking force of the right steering brake 50R is produced.

The left steering brake 50L has the same configuration as the right steering brake 50R.

(Turning Motor)

The turning motor 80 is driven by power from the engine 10. The turning motor 80 rotates in the forward rotating direction or the reverse rotating direction. The rotating direction and the rotation speed of the turning motor 80 are controlled by the controller 100. The rotation speed of the turning motor 80 changes from 0% to 100% (maximum value) in accordance with the power transmitted from the engine 10.

The rotational power of the turning motor 80 is transmitted through the motor power transmitting unit 90 to the left and right steering clutches 40L, 40R. The turning motor 80 causes the left and right steering clutches 40L, 40R to rotate so that a rotation speed difference is produced between the left and right output shafts 60L, 60R. For example, when the bulldozer 1 turns slowly to the right, the turning motor 80 causes the left and right steering clutches 40L, 40R to rotate in opposite directions and the rotation speed of the left output shaft 60L becomes higher than the rotation speed of the right output shaft 60R. When the bulldozer 1 is making a pivot turn to the right, although the turning motor 80 causes the left and right steering clutches 40L, 40R to rotate in opposite directions, the right steering clutch 40R is disengaged and the right steering brake 50R is braked whereby the right output shaft 60R does not rotate and only the left output shaft 60L rotates.

(Motor Power Transmitting Unit)

The motor power transmitting unit 90 is disposed between the turning motor 80 and the left and right steering clutches 40L, 40R. The motor power transmitting unit 90 transmits the rotational power of the turning motor 80 to the left and right steering clutches 40L, 40R.

The motor power transmitting unit 90 has the left and right clutch gears 91L, 91R, a first transfer gear 92, an auxiliary shaft 93, a second transfer gear 94, an idler gear 95, and a pinion gear 96.

The left and right clutch gears 91L, 91R are able to separate from the left and right sun gears 33L, 33R by means of the left and right steering clutches 40L, 40R. The left and right clutch gears 91L, 91R are able to rotate about the axial direction of the input shaft 26. The left clutch gear 91L meshes with the idler gear 95. The right clutch gear 91R is coupled to the first transfer gear 92, the auxiliary shaft 93, and the second transfer gear 94 through the idler gear 95. The left and right clutch gears 91L, 91R rotate in opposite directions when the turning motor 80 rotates.

The idler gear 95 meshes with the left clutch gear 91L, the second transfer gear 94, and the pinion gear 96. The idler gear 95 is able to rotate about the axial direction of the input shaft 26.

The pinion gear 96 meshes with the idler gear 95. The pinion gear 96 is able to rotate about a pinion shaft 96a. The pinion gear 96 rotates due to the rotational power of the turning motor 80 that is transmitted through the pinion shaft 96a.

(Controller)

The controller 100 controls the rotation speed of the engine 10 and the velocity stage clutches and the direction stage clutches of the transmission 23 in order to cause the bulldozer 1 to travel.

The controller 100 controls the left and right steering clutches 40L, 40R, the left and right steering brakes 50L, 50R, and the turning motor 80 thereby causing the bulldozer 1 to travel in any of a "straight travel mode," a "slow turning mode," and a "pivot turning mode."

The controller 100 is connected to a steering lever 35 used for steering operations of the bulldozer 1. The steering lever 35 can be operated in a left turning direction P2 or a right turning direction P3 using a neutral position P1 as a point of reference.

The controller 100 switches between a "straight travel mode," a "slow turning mode," and a "pivot turning mode" in response to the operating amount of the steering lever 35.

Figure 4:
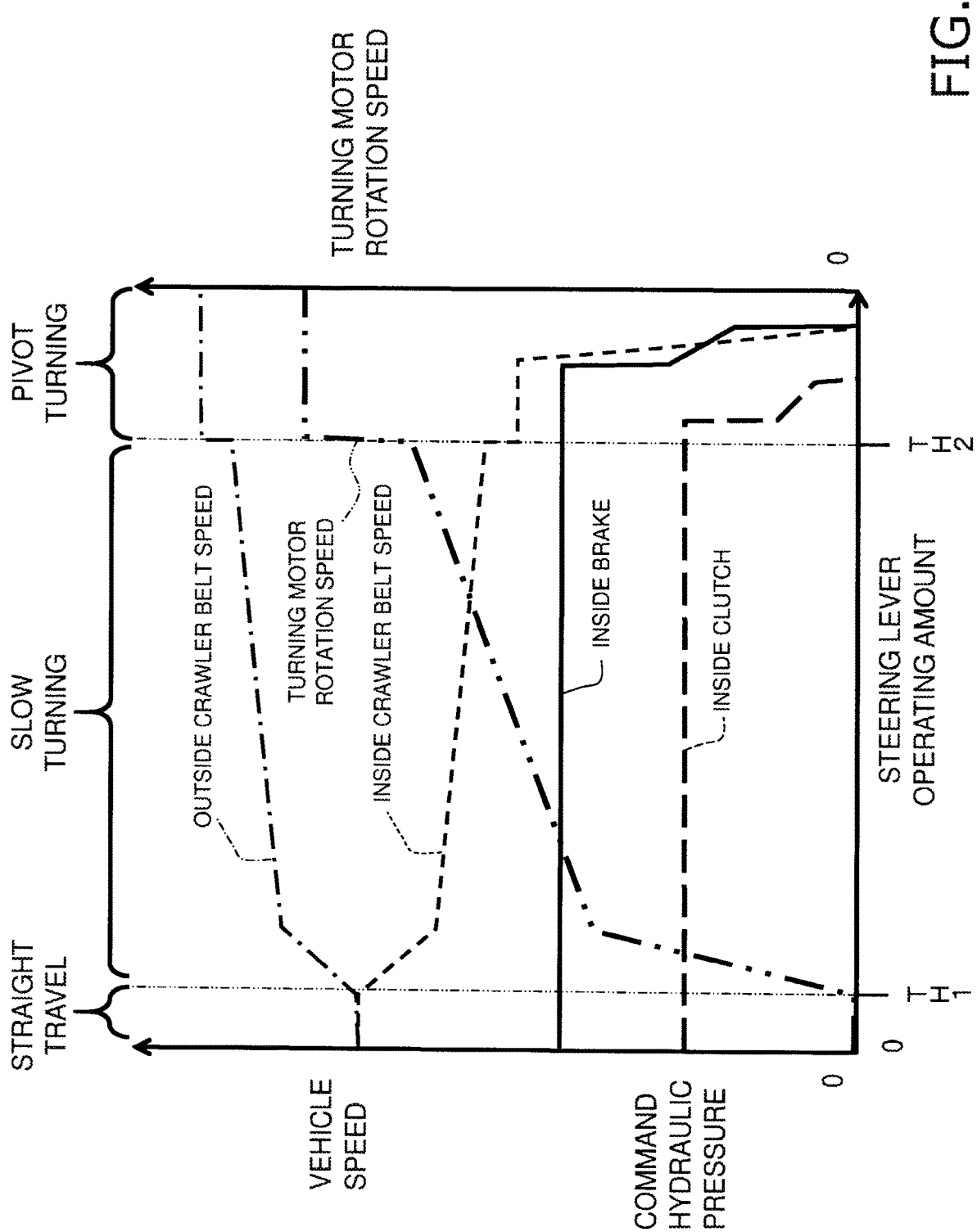
FIG. 4 is a graph illustrating examples of control of the bulldozer performed by the controller according to an embodiment.

FIG. 4 is a graph illustrating examples of control of the bulldozer 1 performed by the controller 100.

The controller 100 causes the bulldozer 1 to travel in the straight travel mode when the operating amount of the steering lever 35 is equal to or less than a first predetermined amount TH1. When the operating amount of the steering lever 35 is greater than the first predetermined amount TH1 and less than a second predetermined amount TH2, the controller 100 causes the bulldozer 1 to turn in the slow turning mode. When the operating amount of the steering lever 35 is equal to or greater than the second predetermined amount TH2, the controller 100 causes the bulldozer 1 to turn in the pivot turning mode.

The second predetermined amount TH2 is greater than the first predetermined amount TH1. The first and second predetermined amounts TH1 and TH2 can be set to desired values. The first predetermined amount TH1 may even be zero.

Straight Travel Mode

In the straight travel mode, the controller 100 controls the left and right clutch control valves 27L, 27R to cause the left and right steering clutches 40L, 40R to engage completely.

In the straight travel mode, the controller 100 controls the left and right brake control valves 28L, 28R to cause the left and right steering brakes 50L, 50R to disengage.

In the straight travel mode, the controller 110 stops the turning motor 80.

Slow Turning Mode

In the slow turning mode, the controller 100 controls the left and right clutch control valves 27L, 27R to cause the left and right steering clutches 40L, 40R to engage (typically to be completely engaged).

In the slow turning mode, the controller 100 controls the left and right brake control valves 28L, 28R to cause the left and right steering brakes 50L, 50R to disengage.

In the slow turning mode, the controller 100 drives the turning motor 80 so that the rotation speed of an inside output shaft $60_{IN}$ is lower than the rotation speed of an outside output shaft $60_{OUT}$ in correspondence to an increase in the operating amount of the steering lever 35.

The inside output shaft $60_{IN}$ is the output shaft corresponding to the operating direction (that is, the turning direction) of the steering lever 35 among the left and right output shafts 60L, 60R. The outside output shaft $60_{OUT}$ is the output shaft opposite the operating direction of the steering lever 35 among the left and right output shafts 60L, 60R.

The controller 100 increases the rotation speed of the turning motor 80 in correspondence to an increase in the operating amount of the steering lever 35. For example, the controller 100 may increase the rotation speed of the turning motor 80 gradually so as to be proportional to the operating amount of the steering lever 35, or may increase the rotation speed of the turning motor 80 in stages in response to the operating amount of the steering lever 35.

While the rotation speed of the turning motor 80 when the operating amount of the steering lever 35 is the second predetermined amount TH2 is not limited in particular so long as the value is sufficiently high, the rotation speed is preferably at least 90%, more preferably at least 95%, and most preferably 100% (maximum value).

Pivot Turning Mode

In the pivot turning mode, the controller 100 controls the left and right clutch control valves 27L, 27R to cause an inside steering clutch $40_{IN}$ to disengage and cause an outside steering clutch $40_{OUT}$ to engage (typically to be completely engaged).

The inside steering clutch $40_{IN}$ is the steering clutch corresponding to the operating direction of the steering lever 35 among the left and right steering clutches 40L, 40R. The outside steering clutch $40_{OUT}$ is the steering clutch in the opposite direction to the operating direction of the steering lever 35 among the left and right steering clutches 40L, 40R.

In the pivot turning mode, the controller 100 controls the left and right brake control valves 28L, 28R to cause an inside steering brake $50_{IN}$ to brake and cause an outside steering brake $50_{OUT}$ to disengage.

The inside steering brake $50_{IN}$ is the steering brake corresponding to the operating direction of the steering lever 35 among the left and right steering brakes 50L, 50R. The outside steering brake $50_{OUT}$ is the steering brake in the opposite direction of the operating direction of the steering lever 35 among the left and right steering brakes 50L, 50R.

In the pivot turning mode, the controller 100 maintains the rotation speed of the turning motor 80 at about the same rotation speed as in the slow turning mode. While the rotation speed of the turning motor 80 is not limited in particular so long as the value is sufficiently high, the rotation speed is preferably at least 90%, more preferably at least 95%, and most preferably 100%.

Switching from Pivot Turning Mode to Straight Travel Mode or Slow Turning Mode

When switching from the pivot turning mode to the straight travel mode or the slow turning mode, the controller 100 transitions the inside steering clutch $40_{IN}$ from the disengaged state to the engaged state, transitions the inside steering brake $50_{IN}$ from the braking state to the disengaged state, and reduces the rotation speed of the turning motor 80.

The controller 100 stops the turning motor 80 (rotation speed=0%) when quickly switching from the pivot turning mode to the straight travel mode. The controller 100 reduces the rotation speed of the turning motor 80 to the rotation speed (0%<rotation speed<100%) corresponding to the operating amount of the steering lever 35 when switching from the pivot turning mode to the slow turning mode.

Figure 5:
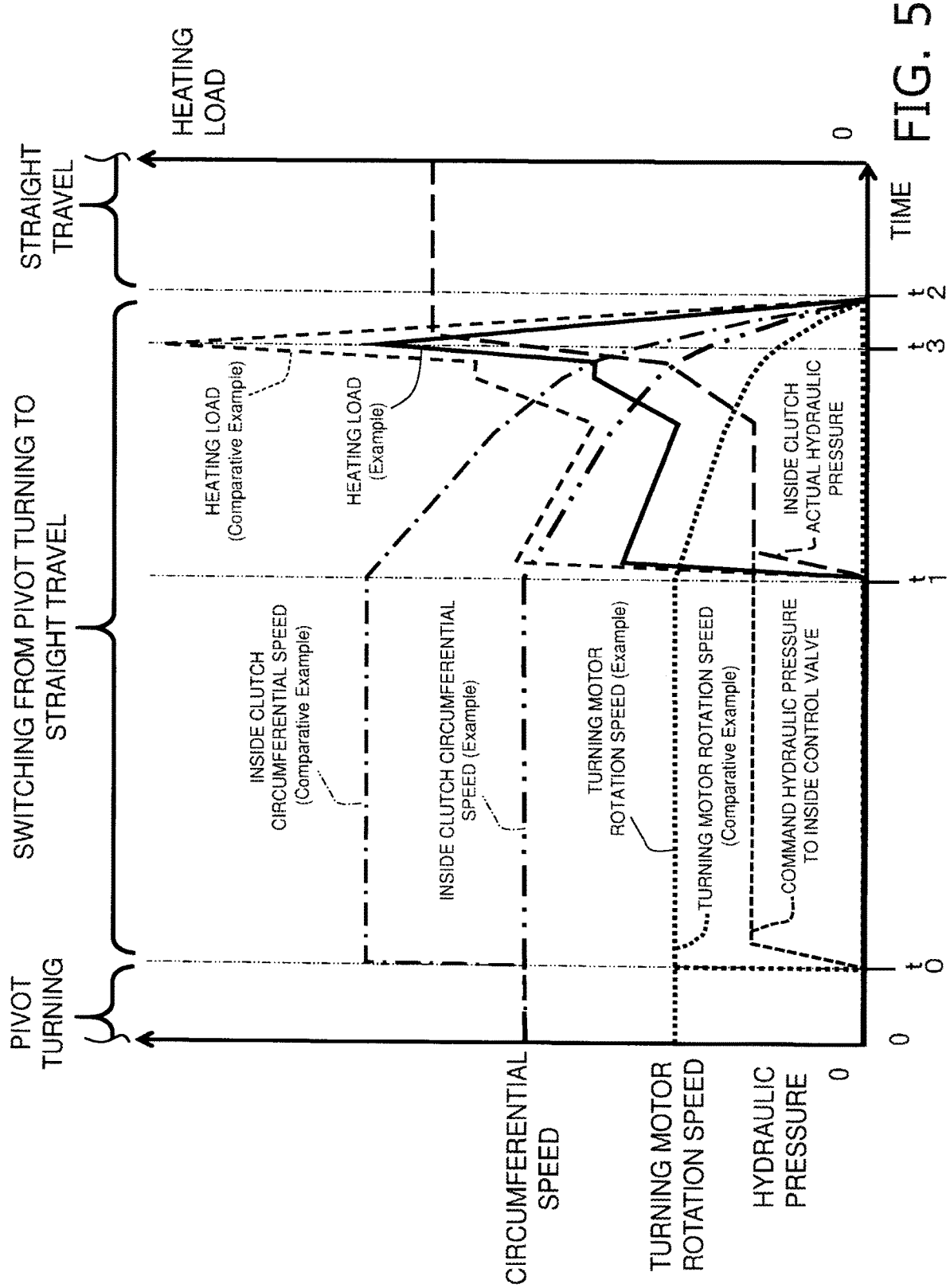
FIG. 5 is a graph illustrating examples of states of the bulldozer when quickly switching from a pivot turning mode to a straight travel mode.

FIG. 5 is a graph illustrating examples of states of the bulldozer 1 when quickly switching from the pivot turning mode to the straight travel mode.

FIG. 5 illustrates the respective temporal changes of a clutch hydraulic pressure command outputted to an inside clutch control valve $27_{IN}$, the actual hydraulic pressure inside the inside steering clutch $40_{IN}$, the rotation speed of the turning motor 80, the circumferential speed of the inside steering clutch $40_{IN}$, and the heating load generated by the inside steering clutch $40_{IN}$.

The inside clutch control valve $27_{IN}$ is the clutch control valve corresponding to the inside steering clutch $40_{IN}$ among the left and right clutch control valves 27L, 27R. The circumferential speed of the inside steering clutch $40_{IN}$ is the relative rotation speed of the inside steering clutch $40_{IN}$ with respect to the inside sun gear $33_{IN}$ that rotates freely due to the rotational power from the input shaft 26.

The respective graphs of an Example and a Comparative Example for the rotation speed of the turning motor 80 and the circumferential speed and heating load of the inside steering clutch $40_{IN}$ are illustrated in FIG. 5. The Example is a situation when the rotation speed of the turning motor 80 is reduced after the partial engagement of the inside steering clutch $40_{IN}$ has started. The Comparative Example is a situation when the rotation speed of the turning motor 80 is reduced before the partial engagement of the inside steering clutch $40_{IN}$ has started.

(A) Control According to Comparative Example

The control according to the Comparative Example is explained in reference to FIG. 5.

The rotation speed of the turning motor 80 is reduced to 0% at a timing t0 when starting to output the clutch hydraulic pressure command to the inside clutch control valve $27_{IN}$. As a result, the circumferential speed of the inside steering clutch $40_{IN}$ increases from the timing t0 onward in comparison to the circumferential speed during pivot turning.

The inside steering clutch $40_{IN}$ is gradually filled with hydraulic fluid from the timing t0 onward and is completely full of hydraulic fluid at a timing t1 (example of a "first timing"). The inside steering clutch $40_{IN}$ starts partial engagement at the timing t1 and is completely engaged at a timing t2 (example of a "second timing"). As a result, the circumferential speed of the inside steering clutch $40_{IN}$ gradually decreases from the timing t1 to the timing t2 and is zero from the timing t2 onward.

The heating load generated by the inside steering clutch $40_{IN}$ starts to gradually increase from the timing t1 when the inside steering clutch $40_{IN}$ begins partial engagement, the highest value of the heating load is recorded at a timing t3, and thereafter the heating load reaches zero at the timing t2 when the inside steering clutch $40_{IN}$ is completely engaged.

In this way, because the rotation speed of the turning motor 80 decreases from before the timing t1 at which the inside steering clutch $40_{IN}$ begins partial engagement, the circumferential speed of the inside steering clutch $40_{IN}$ increases at the timing t1 and, as a result, the heating load generated by the inside steering clutch $40_{IN}$ increases in the Comparative Example.

(B) Control According to Example

The control according to the Example is explained in reference to FIG. 5.

The rotation speed of the turning motor 80 is maintained from the timing t0 onward when starting to output the clutch hydraulic pressure command to the inside clutch control valve $27_{IN}$. As a result, the circumferential speed of the inside steering clutch $40_{IN}$ stays the same as the circumferential speed during pivot turning from the timing t0 onward.

The inside steering clutch $40_{IN}$ is gradually filled with hydraulic fluid from the timing t0 onward and is completely full of hydraulic fluid at the timing t1. The inside steering clutch $40_{IN}$ begins partial engagement at the timing t1 and is completely engaged at the timing t2. As a result, the circumferential speed of the inside steering clutch $40_{IN}$ gradually decreases from the timing t1 to the timing t2 and is zero from the timing t2 onward.

The heating load generated by the inside steering clutch $40_{IN}$ starts to gradually increase from the timing t1 when the inside steering clutch $40_{IN}$ begins partial engagement, the highest value of the heating load is recorded at the timing t3, and thereafter the heating load becomes zero at the timing t2 when the inside steering clutch $40_{IN}$ is completely engaged.

In this way, because the rotation speed of the turning motor 80 is maintained up to the timing t1 at which the inside steering clutch $40_{IN}$ begins partial engagement, the circumferential speed of the inside steering clutch $40_{IN}$ is lower in comparison to the abovementioned Comparative Example at the timing t1 and, as a result, the heating load generated by the inside steering clutch $40_{IN}$ can be restrained in the Example.

While the rotation speed of the turning motor 80 is quickly reduced after passing the timing t1 at which the inside steering clutch $40_{IN}$ begins partial engagement in the Example, the present invention is not limited thereto. The heating load restraining effect can be achieved if the rotation speed of the turning motor 80 is maintained even after passing the timing t1 at which the inside steering clutch $40_{IN}$ begins partial engagement. Therefore, the controller 100 may maintain the rotation speed of the turning motor 80 from the timing t1 onward.

While the turning motor 80 is stopped exactly at the timing t2 at which the inside steering clutch $40_{IN}$ is completely engaged in the Example, the present invention is not limited thereto. The mode can be promptly switched to the straight travel mode even if the turning motor 80 is stopped before the timing t2 at which the inside steering clutch 40 IN is completely engaged. Therefore, the controller 100 may not stop the turning motor 80 at the timing t2 or before.

In addition, the turning motor 80 is stopped in the Example from the timing t3 at which the highest value of the heating load generated by the inside steering clutch $40_{IN}$ is recorded. As a result, the highest value of the heating load generated by the inside steering clutch $40_{IN}$ can be reduced in comparison to when the turning motor 80 is stopped before the timing t3.

While the rotation speed control of the turning motor 80 when quickly changing from the pivot turning mode to the straight travel mode has been explained with reference to FIG. 5, the same rotation speed control of the turning motor 80 is performed when switching from the pivot turning mode to the slow turning mode.

Modification of the Embodiment

The present invention is not limited to the above embodiment and various changes and modifications may be made without departing from the spirit of the invention.

(Modification 1)

While the controller 100 in the above embodiment switches from the slow turning mode to the pivot turning mode and switches from the pivot turning mode to the slow turning mode in response to the operating amount of the steering lever 35, the present invention is not limited in this way. The controller 100 may switch from the slow turning mode to the pivot turning mode in response to the operating amount of the steering lever 35 being greater than the first predetermined amount TH1 and in response to the reception of a pivot turn instruction from the operator. Furthermore, the controller 100 may switch from the pivot turning mode to the slow turning mode in accordance with having not received a pivot turn instruction from the operator during the pivot turning mode.

Figure 6:
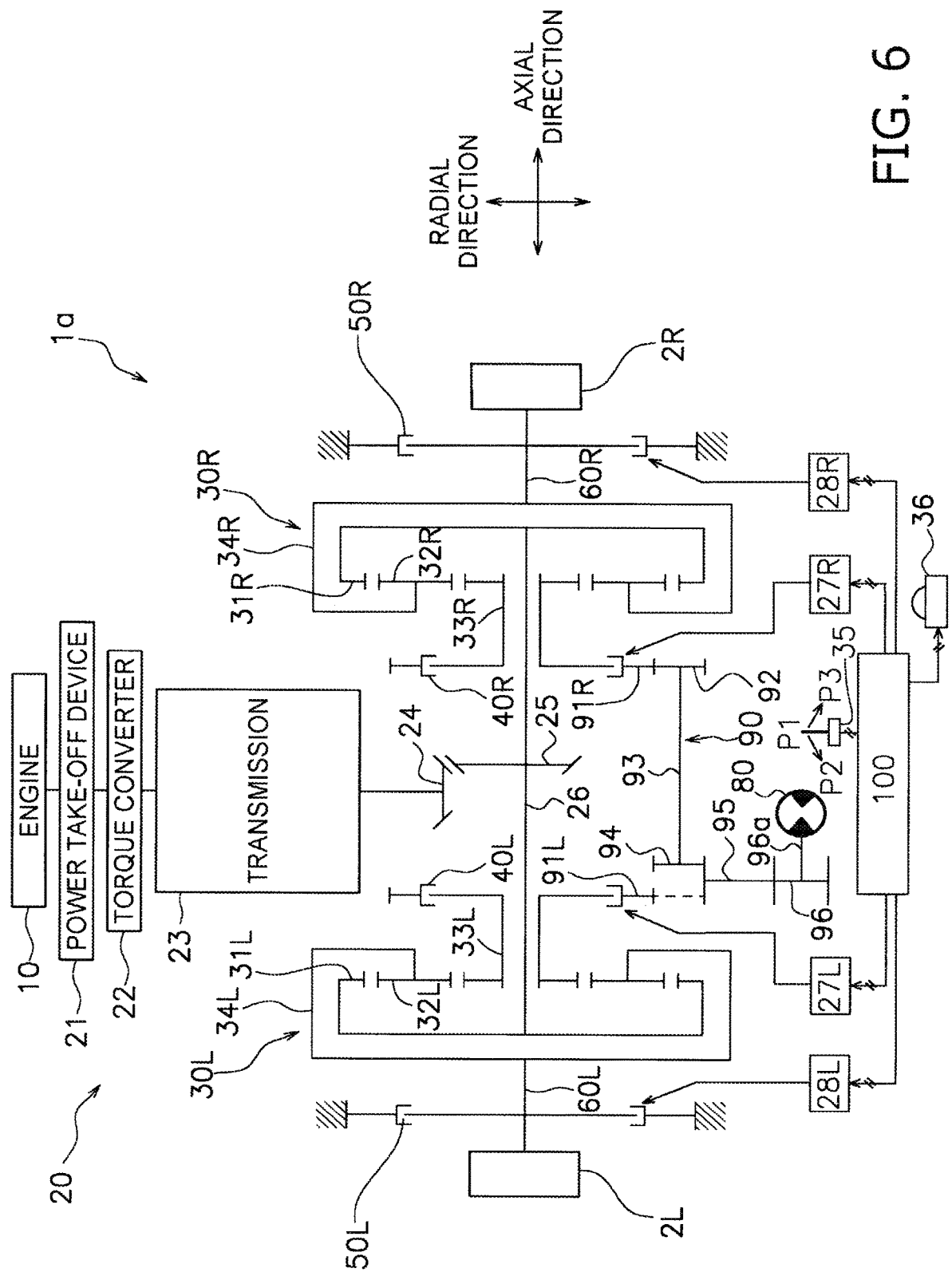
FIG. 6 is an outline system configuration view of the power transmission system of the bulldozer according to a first modification.

FIG. 6 is an outline system configuration view of the power transmission system of a bulldozer 1a according to the present modified example. The bulldozer 1a is provided with the same configuration as the bulldozer 1 according to the above embodiment except that a pivot turn button 36 is provided.

The pivot turn button 36 is connected to the controller 100. The pivot turn button 36 receives the pivot turn instruction from the operator. When the pivot turn button 36 is pressed by the operator, the pivot turn button 36 transmits the pivot turn instruction to the controller 100. The pivot turn instruction may be transmitted to the controller 100 while the pivot turn button 36 is being pressed by the operator, or the pivot turn instruction may be continuously transmitted to the controller 100 until the pivot turn button 36 is pressed again by the operator.

The controller 100 sets the travel mode of the bulldozer 1 to the straight travel mode as explained in the above embodiment when the operating amount of the steering lever 35 is equal to or less than the first predetermined amount TH1.

The controller 100 sets the travel mode of the bulldozer 1 to the slow turning mode when the operating amount of the steering lever 35 is greater than the first predetermined amount TH1 and no pivot turn instruction has been received. The control by the controller 100 in the slow turning mode is as explained in the above embodiment.

The controller 100 sets the travel mode of the bulldozer 1 to the pivot turning mode when the operating amount of the steering lever 35 is greater than the first predetermined amount TH1 and the pivot turn instruction has been received. The control by the controller 100 in the pivot turning mode is as explained in the above embodiment.

The control by the controller 100 when switching from the pivot turning mode to the slow turning mode is as explained in the above embodiment.

(Modification 2)

While the left and right steering clutches 40L, 40R are positive-type hydraulic clutches in the above embodiment, the left and right steering clutches 40L, 40R may also be negative-type hydraulic clutches.

(Modification 3)

While the left and right steering brakes 50L, 50R are negative-type hydraulic brakes in the above embodiment, the left and right steering brakes 50L, 50R may also be positive-type hydraulic brakes.

(Modification 4)

While the left and right output shafts 60L, 60R are respectively coupled to the left and right sprockets 2L, 2R in the above embodiment, left and right final drive gears may be respectively interposed between the left and right output shafts 60L, 60R and the left and right sprockets 2L, 2R.

(Modification 5)

While the rotation speed control of the turning motor 80 is performed for both the situation of switching from the pivot turning mode to the straight travel mode and the situation of switching from the pivot turning mode to the slow turning mode in the above embodiment, the rotation speed control of the turning motor 80 may be performed for only one of the above situations.

The invention claimed is:

1. A crawler-type work machine comprising:
   left and right planetary gear mechanisms disposed between an input shaft and left and right output shafts;
   left and right steering clutches configured to rotate about the input shaft and switch between transmitting and blocking rotational power from the input shaft to the left and right output shafts using the left and right planetary gear mechanisms;
   left and right steering brakes configured to brake the left and right output shafts;
   a turning motor configured to cause the left and right steering clutches to rotate so that a rotation speed difference is produced between the left and right output shafts;
   a controller configured to control the left and right steering clutches, the left and right steering brakes, and the turning motor to cause the crawler-type work machine to travel in a straight travel mode, a slow turning mode, or a pivot turning mode,
   in the straight travel mode, the controller being configured to cause the left and right steering clutches to engage, cause the left and right steering brakes to disengage, and stop the turning motor;
   in the slow turning mode, the controller being configured to cause the left and right steering clutches to engage, cause the left and right steering brakes to disengage, and drive the turning motor;
   in the pivot turning mode, the controller being configured to cause an inside steering clutch corresponding to a steering direction of the left and right steering clutches to disengage, and cause an inside steering brake corresponding to the steering direction of the left and right steering brakes to brake, and drive the turning motor; and
   when switching from the pivot turning mode to the straight travel mode or the slow turning mode, the controller being configured to maintain a rotation speed of the turning motor until after a first timing at which the inside steering clutch begins partial engagement.

2. The crawler-type work machine according to claim 1, wherein
   when switching from the pivot turning mode to the straight travel mode or the slow turning mode, the controller is configured to stop the turning motor at or before a second timing at which the inside steering clutch is completely engaged.

3. The crawler-type work machine according to claim 1, wherein
   the left and right planetary gear mechanisms each have
   a ring gear coupled to the input shaft,
   a sun gear rotatably attached to the input shaft and coupled to the respective steering clutch,
   a planetary gear disposed between the ring gear and the sun gear, and
   a carrier coupled to the planetary gear and the output shaft.

4. The crawler-type work machine according to claim 3, further comprising:

left and right clutch gears configured to separate from the sun gear of the respective planetary gear mechanisms using the left and right steering clutches, and to rotate in opposite directions; and an idler gear configured to transmit rotational power from the turning motor to the left and right clutch gears.

\* \* \* \* \*